United States Patent [19]

Hewitt

[11] 4,138,135
[45] Feb. 6, 1979

[54] BOAT TRAILER

[76] Inventor: Johnnie D. Hewitt, Rte. 1, Box 227, Farmington, Ark. 72730

[21] Appl. No.: 831,614

[22] Filed: Sep. 8, 1977

[51] Int. Cl.$^2$ ............................................. B60P 3/10
[52] U.S. Cl. ............................................. 280/414 R
[58] Field of Search ..................... 280/414 R, 414 A; 214/85, 505

[56] References Cited

U.S. PATENT DOCUMENTS

| | | | |
|---|---|---|---|
| 3,447,815 | 6/1969 | West | 280/414 R |
| 4,011,958 | 3/1977 | Carrick | 280/414 R |
| 4,033,600 | 7/1977 | Watson | 280/414 R |

Primary Examiner—Joseph F. Peters, Jr.
Assistant Examiner—R. Schrecengost
Attorney, Agent, or Firm—Zarley, McKee, Thomte, Voorhees & Sease

[57] ABSTRACT

A boat trailer comprising a wheeled frame having a tongue extending from the forward end thereof. A boat support bed is provided on the frame between the opposite sides thereof for supporting the bottom portion of a boat. A pair of spaced apart arms are pivotally secured to the frame at one side thereof and extend upwardly therefrom. A guide rail is secured to and extends between the upper ends of the first pair of arms for engagement with one side of the boat. A spring is connected to each of the arms for yieldably urging the guide rail into engagement with the side of the boat. A second pair of arms are pivotally secured to the frame at the other side thereof and extends upwardly therefrom. A second guide rail is secured to the upper ends of the second pair of arms for engagement with the other side of the boat. The guide rails are laterally adjustably mounted on the arms which are also laterally adjustably mounted on the frame.

4 Claims, 4 Drawing Figures

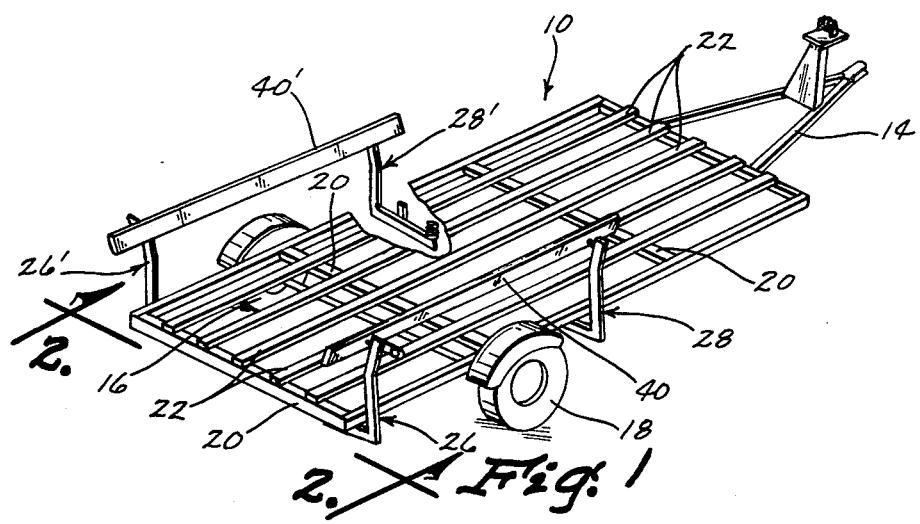
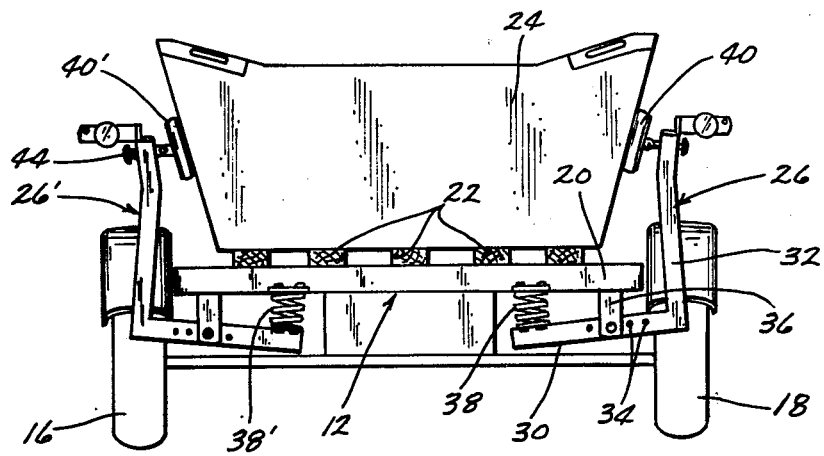
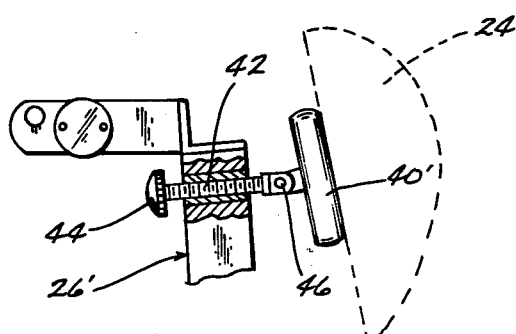
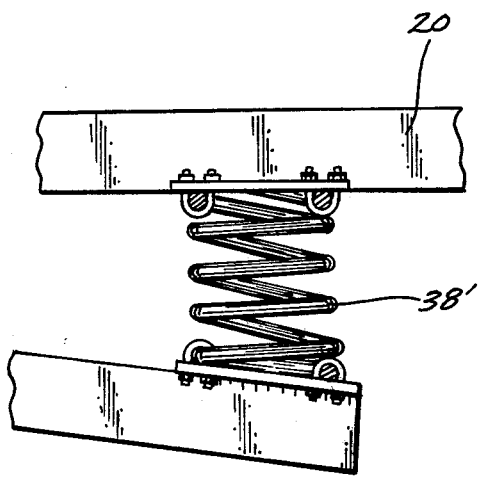

BOAT TRAILER

BACKGROUND OF THE INVENTION

This invention relates to a boat trailer and more particularly to a boat trailer having a pair of longitudinally extending guide rails at each side thereof for engagement with opposite sides of a boat.

Many types of boat trailers have been provided wherein means is provided for guiding the boat onto the trailer and for supporting the boat thereon once the boat is loaded on the trailer. However, the existing boat trailers do not provide ample support along substantially the entire length of the boat but only engage the boat at spaced apart locations which can cause damage to the boat since forces are applied to the boat at concentrated locations. Further, the prior art boat trailers are not readily adaptable for Jon boats but are primarily designed for larger boats having V-shaped hulls.

Therefore, it is a principal object of the invention to provide an improved boat trailer.

A still further object of the invention is to provide a boat trailer wherein a pair of spaced apart guide rails are provided at each side of the trailer for engagement with opposite sides of the boat.

A still further object of the invention is to provide a boat trailer including means for supporting the boat trailer thereon wherein guide rails engage a large portion of opposite sides of the boat.

A still further object of the invention is to provide a boat trailer having adjustable guide and support means.

A still further object of the invention is to provide a boat trailer which is well suited for Jon boats or the like.

These and other objects will be apparent to those skilled in the art.

BRIEF DESCRIPTION OF THE DRAWINGS

FIG. 1 is a rear perspective view of the boat trailer with portions thereof cut away to more fully illustrate the invention:

FIG. 2 is a rear view of the boat trailer having a boat mounted thereon as seen on lines 2—2 of FIG. 1:

FIG. 3 is a partial sectional view of the means for adjustably securing one end of the guide rail to the support arm; and FIG. 4 is an enlarged view of the means for resiliently mounting the support arms.

DESCRIPTION OF THE PREFERRED EMBODIMENT

The boat trailer of this invention is referred to generally by the reference numeral 10 and comprises a frame means 12 having a forwardly extending tongue 14 at the forward end thereof. Wheels 16 and 18 are provided at opposite sides in conventional fashion.

As seen in the drawings, trailer 10 includes a plurality of spaced apart and laterally extending frame members 20 having a plurality of longitudinally extending and spaced apart frame members 22 secured thereto. Frame memebers 22 are preferrably constructed of wood such as 2" × 2" to provide a supporting surface for the flat bottom of a Jon boat 24 as illustrated in FIG. 2.

Arms 26 and 28 are pivotally connected to one side of the frame means. Inasmuch as arms 26 and 28 are identical, only arm 26 will be described. Arm 26 generally comprises a lower leg portion 30 having a leg portion 32 extending upwardly therefrom. Lower leg portion 30 is provided with a plurality of spaced apart openings 34 provided therein to permit the leg portion 30 to be laterally adjustably pivotally secured to the downwardly extending bracket 36. A spring 38 is secured to the inner end of leg portion 30 and one of the frame members 20 as illustrated in FIG. 2 so that the upper end of arm 26 is urged inwardly towards the boat. Guide rail 40 is adjustably secured to and extends between the upper ends of the arms 26 and 28 as will be described in more detail hereinafter.

A pair of support arms 26' and 28' are also pivotally secured to the other side of the trailer as illustrated in the drawings and are identical to arms 26 and 28. Likewise, a guide rail 40' is secured to and extends between the upper ends of the arms 26' and 28'. FIG. 3 illustrates the manner in which the guide rails are laterally adjustably mounted to each of the support arms. As seen in FIG. 3, the support arm 26' has a threaded member 42 threadably mounted therein. The outer end of threaded member 42 is provided with a knob 44 for convenience. The inner end of the threaded member 42 is pivotally connected to the guide rail 40' at 46.

The various springs 38 normally urge the upper ends of the support arms inwardly as previously described. As the boat is being loaded onto the trailer, the guide rails 40 and 40' will engage the forward portion of the boat and will move outwardly as the wider portion of the boat is being moved forwardly. The flat support members 22 provide substantially a continuous supporting surface for the bottom of the boat 24 as illustrated in FIG. 2. When the boat is positioned on the trailer as illustrated in FIG. 2, the guide rails 40 and 40' engage a large portion of the sides of the boat so that any pressure exerted on the boat will be distributed over a wide area thereby insuring that the boat will not be damaged during transportation or storage. The springs 38 cause the guide rails 40 and 40' to be yieldably urged into engagement with the sides of the boat so that the boat will be positively maintained on the trailer and so that the boat will be properly positioned on the trailer. The support arms may be laterally adjusted with respect to the brackets 36 to accommodate boats of various widths. Likewise, the threaded members 42 may be adjusted so that the guide rails will be in proper engagement with the sides of the boat. The individual resilient mounting of the spaced apart arms also insures that the guide rails will more readily conform to the configuration of the boat.

Thus it can be seen that a novel boat trailer has been provided which accomplishes at least all of the stated objectives.

I claim:

1. A boat trailer comprising, a wheel frame means having rearward and forward ends and opposite sides, said frame means having a forwardly extending tongue for connection to a prime mover, a boat support means on said frame means between the opposite sides thereof for supporting the bottom portion of a boat, at least first and second spaced apart arms pivotally secured to said frame means at one side thereof, said first and second arms having upper ends disposed above said boat support means, a first guide rail secured to and extending between said first and second arms adjacent said upper ends for engagement with one side of a boat, resilient means connected to said first and second arms for yieldably urging said first guide rail into engagement with said one side of the boat, at least third and fourth spaced apart arms pivotally secured to said frame means at the other side thereof, said third and fourth arms having upper ends disposed above said boat support means, a second guide rail secured to and extending between said third and fourth arms adjacent said upper ends for engagement with the other side of a boat, resilient means connected to said third and fourth arms for yieldably urging said second guide rail into engagement with said other side of the boat.

2. The boat trailer of claim 1 wherein said guide rails are laterally adjustably mounted on said arms.

3. The boat trailer of claim 1 wherein said arms are laterally adjustably mounted on said frame means.

4. The boat trailer of claim 1 wherein said boat support means comprises a plurality of spaced apart longitudinally extending support members.

* * * * *